United States Patent
Mah et al.

(10) Patent No.: US 10,096,825 B2
(45) Date of Patent: Oct. 9, 2018

(54) COMPOSITE ANODE ACTIVE MATERIAL, PREPARING METHOD THEREOF, ANODE INCLUDING THE COMPOSITE ANODE ACTIVE MATERIAL, AND LITHIUM SECONDARY BATTERY INCLUDING THE ANODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Sangkook Mah, Seoul (KR); Gyusung Kim, Suwon-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 371 days.

(21) Appl. No.: 14/983,715

(22) Filed: Dec. 30, 2015

(65) Prior Publication Data
US 2016/0190596 A1    Jun. 30, 2016

(30) Foreign Application Priority Data
Dec. 31, 2014 (KR) .................. 10-2014-0195960

(51) Int. Cl.
| | |
|---|---|
| H01M 4/38 | (2006.01) |
| H01M 4/134 | (2010.01) |
| H01M 4/136 | (2010.01) |
| H01M 4/36 | (2006.01) |
| H01M 4/58 | (2010.01) |

(52) U.S. Cl.
CPC ........... H01M 4/386 (2013.01); H01M 4/134 (2013.01); H01M 4/136 (2013.01); H01M 4/364 (2013.01); H01M 4/366 (2013.01); H01M 4/58 (2013.01)

(58) Field of Classification Search
CPC ...... H01M 4/386; H01M 4/366; H01M 4/364; H01M 4/134; H01M 4/136; H01M 4/58
See application file for complete search history.

(56) References Cited

U.S. PATENT DOCUMENTS

| | | | |
|---|---|---|---|
| 7,906,238 | B2 | 3/2011 | Le |
| 8,530,067 | B2 | 9/2013 | Miyaki et al. |
| 2008/0113271 | A1 | 5/2008 | Ueda et al. |
| 2011/0215280 | A1* | 9/2011 | Obrovac .......... H01M 4/38 252/516 |
| 2012/0070741 | A1 | 3/2012 | Liu et al. |

(Continued)

FOREIGN PATENT DOCUMENTS

| | | |
|---|---|---|
| JP | 2009-289680 A | 12/2009 |
| JP | 5129007 B2 | 11/2012 |

(Continued)

OTHER PUBLICATIONS

Maille et al. "Study of the nitridation process of TiSi2 powder". Applied Surface Science, 260 (2012), pp. 29-31.*

*Primary Examiner* — Laura Weiner
(74) *Attorney, Agent, or Firm* — Cantor Colburn LLP

(57) ABSTRACT

A composite anode active material includes a first core member including a silicon-containing material; a second core member including at least one selected from metal nitride and metal carbide; and a coating layer on at least one of the first core member and the second core member. The coating layer contains metal silicide.

19 Claims, 4 Drawing Sheets

(56) References Cited

U.S. PATENT DOCUMENTS

| | | |
|---|---|---|
| 2012/0231339 A1 | 9/2012 | Park et al. |
| 2013/0143124 A1 | 6/2013 | Lee et al. |
| 2013/0244107 A1 | 9/2013 | Rojeski |
| 2013/0244110 A1 | 9/2013 | Miyoshi et al. |
| 2013/0344383 A1 | 12/2013 | Loveness et al. |

FOREIGN PATENT DOCUMENTS

| | | |
|---|---|---|
| KR | 1020070098924 A | 10/2007 |
| KR | 1020080019801 A | 3/2008 |
| KR | 101125969 B1 | 3/2012 |
| KR | 1020120101971 A | 9/2012 |
| KR | 1020130096270 A | 8/2013 |
| KR | 1020140089643 A | 7/2014 |

\* cited by examiner

COMPOSITE ANODE ACTIVE MATERIAL, PREPARING METHOD THEREOF, ANODE INCLUDING THE COMPOSITE ANODE ACTIVE MATERIAL, AND LITHIUM SECONDARY BATTERY INCLUDING THE ANODE

CROSS-REFERENCE TO RELATED APPLICATION

This application claims priority to Korean Patent Application No. 10-2014-0195960, filed on Dec. 31, 2014, and all the benefits accruing therefrom under 35 U.S.C. § 119, the content of which in its entirety is herein incorporated by reference.

BACKGROUND

1. Field

The present disclosure relates to a composite anode active material, a method of preparing the composite anode active material, an anode including the composite anode active material, and a lithium secondary battery including the anode.

2. Description of the Related Art

Due to high energy density and convenience in design, lithium secondary batteries have served as a main source of electrical power of mobile electronic devices. The application of the lithium secondary battery as a power source of an electrical vehicle or an electrical power storage device of renewable energy has been broadened. In order to correspond such demand of the market, studies on materials of a lithium secondary battery having relatively high energy density and relatively long lifespan characteristics have been continuously progressing. Among active materials for an anode of a lithium secondary battery, for example, studies on various materials such as silicon, tin or germanium, as well as carbon have been conducted.

SUMMARY

Provided are a composite anode active material having an improved capacity retention ratio, a method of preparing the composite anode active material, an anode including the composite anode active material, and a lithium secondary battery having improved lifespan characteristics by including the anode.

Additional embodiments will be set forth in part in the description which follows and, in part, will be apparent from the description, or may be learned by practice of the presented exemplary embodiments.

According to an exemplary embodiment, a composite anode active material includes a first core member including a silicon-containing material; a second core member including at least one selected from metal nitride and metal carbide; and a coating layer on at least one of the first core member and the second core member. The coating layer contains metal silicide.

According to another exemplary embodiment, an anode includes an anode active material member defined by a shaped composite anode active material.

According to another exemplary embodiment, a lithium secondary battery includes the anode.

According to another exemplary embodiment, a method of preparing the composite anode active material includes milling a silicon-containing material to form a first core member of the composite anode active material; milling metal silicide to form a coating layer of the composite anode active material; milling at least one selected from metal nitride and metal carbide to form a second core member of the composite anode active material, and disposing the coating layer on the first core member and the second core member to prepare the composite anode active material.

BRIEF DESCRIPTION OF THE DRAWINGS

These and/or other features will become apparent and more readily appreciated from the following description of the exemplary embodiments, taken in conjunction with the accompanying drawings in which.

DETAILED DESCRIPTION

Figure 1:
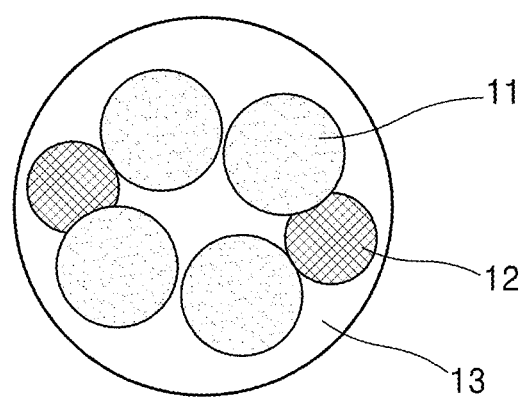
FIG. 1 is a schematic view of a structure of a composite anode active material according to an exemplary embodiment.

Reference will now be made in detail to exemplary embodiments, examples of which are illustrated in the accompanying drawings, where like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain the invention.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Among anode active materials, a silicon-based material has relatively high energy density compared to that of a graphite material which is commonly used as an anode active material. However, when the silicon-based material is used as an anode active material, a relatively unstable solid electrolyte interface ("SEI") layer may be formed by a side reaction between a silicon surface and an electrolyte and may deteriorate electrochemical characteristics of the anode active material. Or, when the silicon-based material is used as an anode active material, due to internal stress caused by rapid volume expansion that occurs during a charging/discharging process, the silicon-based material may be undesirably pulverized. Therefore, there remains a need for an alternative anode active material such as a composite anode active material that reduces or effectively prevents formation of an SEI layer by suppressing a side reaction between a silicon surface and an electrolyte and that suppresses rapid volume expansion that occurs during a charging/discharging process.

Hereinafter, according to one or more exemplary embodiments, a composite anode active material, a method of preparing the composite anode active material, an anode including the composite anode active material, and a lithium battery including the anode will be described.

According to an exemplary embodiment, a composite anode active material includes a first core member that includes a silicon-based material; a second core member that includes at least one selected from a metal nitride and a metal carbide; and a coating layer that is formed on at least one surface of the first core member and the second core member, where the coating layer contains a metal silicide.

The coating layer may include or define an interfacial layer between the first core member and the second core member.

The coating layer may be a continuous layer or a discontinuous layer in the form of discrete members or islands. Also, the coating layer may have, for example, a structure that completely covers the first core member and the second core member such that no portion thereof is exposed from the coating layer. That is, within the anode active material structure, the first core member and the second core member are not exposed outside the coating layer.

As used herein, the composite anode active material is an anode active material that is prepared by bonding at least two materials having different physical or chemical properties from each other, where characteristics of the composite anode active material are different from those of each of the materials that constitute the composite anode active material, and the materials are distinctive in macro or micro scales in the final structure of the composite anode active material.

When a general silicon-based material is used as an anode active material, a method of coating a carbon-based material on a surface of the silicon-based material or combining by milling the silicon-based material and a carbon-based material to increase conductivity of the silicon-based material is commonly known in the art.

However, when the highly irreversible carbon-based material is coated as described above or the carbon-based material pulverized in the milling method described above, the irreversible property of the carbon-based material increases, and thus a capacity retention ratio or an initial efficiency of a lithium secondary battery formed with members including the carbon-based material may deteriorate.

In this regard, a lithium secondary battery having an improved capacity retention ratio has been manufactured by providing a composite anode active material that includes at least one selected from a metal nitride and a metal carbide that have a relatively higher hardness and a relatively higher electric conductivity compared to those of silicon; and a metal silicide that has a relatively lower hardness but a higher electric conductivity compared to those of silicon. When the at least one selected from a metal nitride and a metal carbide is added to silicon, pulverization and amorphization of silicon particles may be accelerated. As a result, volume expansion of the anode active material may be suppressed, and thus lifespan and conductivity of a lithium secondary battery including the anode active material may improve.

In the composite anode active material, the metal silicide has a relatively high strength compared to that of a carbon-based material and thus may easily compensate volume expansion of the silicon-based material during a charging/discharging process, and the metal silicide has improved electrical conductivity and thus may provide improved charging/discharging efficiency, relatively high-rate characteristics and lifespan characteristics of lithium secondary battery including the anode active material. Also, the metal silicide includes a silicon component therein and thus may provide an improved capacity lithium secondary battery including the anode active material compared to when a pure inert metal or a carbon-based material is used as the anode active material.

In the composite anode active material, the metal silicide may be amorphous or low-crystalline. The metal silicide being amorphous or low crystalline in the composite anode active material may be confirmed when a metal silicide peak is not observed by X-ray diffraction analysis. When the metal silicide is amorphous or low-crystalline, lifespan characteristics of the composite anode active material may improve.

In exemplary embodiments, for example, the at least one selected from a metal nitride and a metal carbide may include at least one metal selected from titanium (Ti), vanadium (V), copper (Cu), zinc (Zn), molybdenum (Mo), nickel (Ni), aluminum (Al), magnesium (Mg), iron (Fe), tantalum (Ta), tungsten (W), zirconium (Zr) and chromium (Cr). In exemplary embodiments, for example, the at least one selected from a metal nitride and a metal carbide is a titanium nitride (TiN), a titanium carbide (TiC) or a combination thereof.

In exemplary embodiments, for example, an amount of the at least one selected from a metal nitride and a metal carbide is in a range of about 1 part to about 70 parts by weight, or, for example, about 20 parts to about 50 parts by weight, based on 100 parts by weight of the silicon-based material. When the amount of the at least one selected from a metal nitride and a metal carbide is within the above described ranges, the lithium secondary battery including the anode active material may have excellent lifespan and electrical conductivity.

The metal silicide may be a compound represented by Formula 1.

$$M_aSi_b \qquad \text{Formula 1}$$

In Formula 1, 1≤a≤4 and 1≤b≤3; and M is a metal element of Groups 1 and 2 or a transition metal of Groups 3 to 12.

In an exemplary embodiment, for example, the metal silicide may be at least one selected from $TiSi_2$, $CaSi_2$, $Mg_2Si$, $Cu_3Si$, NiSi and FeSi.

In the composite anode active material, an amount of the metal silicide may be in a range of about 0.1 part to about 70 parts by weight, or, for example, about 20 parts to about 60 parts by weight, based on 100 parts by weight of the silicon-based material. In the composite anode active material, when the amount of the metal silicide is within the above-described ranges, electrical conductivity characteristics and lifespan characteristics of the lithium secondary battery including the composite anode active material may be excellent without a significant decrease in a discharge capacity of the lithium secondary battery.

As shown in FIG. 1, a composite anode active material according to an exemplary embodiment has a structure in which a first core member 11 is provided in plural, a second core member 12 is provided in plural and a coating layer 13 is disposed on a entirety of the outer surfaces of the first and second core members 11 and 12. The coating layer 13 completely covers the first core member 11 and the second core member 12. The coating layer 13 may define an outermost surface of the structure of the anode active material. The first core member 11 includes silicon as a silicon-based material; and the second core member 12 include at least one selected from a metal nitride and a metal carbide. The coating layer 13 includes a metal silicide. In an exemplary embodiment, the composite anode active material may not include (e.g., exclude a carbon-based material), but the invention is not limited thereto.

In the composite anode active material according to an exemplary embodiment, the silicon-based material may include a silicon-containing material such as silicon (Si), $SiO_x$ (where, 0<x<2), a silicon-based alloy (a Si—Z alloy, where, Z is an alkaline metal, an alkaline earth metal, a Group 13-16 element, a transition metal, a rare earth element, or a combination thereof, and is not Si). Examples of the element Z may include Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po or a combination thereof. When a silicon-based alloy is used as the silicon-based material, the silicon-based alloy is selected so that the silicon-based alloy is different from a composition of the metal silicide described above.

The first core member 11 that includes the silicon-based material may simultaneously include a crystalline area and an amorphous area. In an exemplary embodiment, for example, the first core member 11 that includes the silicon-based material may include a first core portion A that includes a crystalline silicon-based material; and a first core portion B that is disposed or formed on the first core portion A and includes an amorphous metal. That is, the first core portion B including an amorphous silicon-based material may be disposed or formed on at least a part of the first core portion A including a crystalline silicon-based material. In an exemplary embodiment, for example, the first core portion B may cover the first core portion A. Such structure may result when an exterior of the silicon-based material is amorphized, and amorphization of the silicon-based material is not completed during a process of milling crystalline silicon-based material. When the first core member simultaneously includes a crystalline area and an amorphous area as described above, electrical conductivity and lifespan characteristics of a lithium secondary battery including the composite anode active material may improve compared to those of a lithium secondary battery including an anode active material that is crystalline as a whole.

In the composite anode active material, a thickness of the coating layer may be in a range of about 1 nanometer (nm) to about 500 nanometers (nm), or, for example, about 10 nm to about 100 nm. When the thickness of the coating layer is within the above-described ranges, a capacity retention ratio of the composite anode active material may be excellent.

The composite anode active material may further include a carbon-based material. The carbon-based material may be further disposed or coated on (e.g., outside) active material particles included in the metal silicide or may be dispersed and combined within the composite anode active material. The carbon-based material is not particularly limited, and any of a number of materials available as a carbon-based material in the art may be used as a carbon-based material. Examples of the carbon-based material may include, but are not limited to, a calcinated product of a precursor of a carbon-based material such as a polymer, carbon fibers, carbon nanotubes ("CNTs"), graphites or amorphous carbon. In the composite anode active material, an amount of the carbon-based material may be in a range of about 1 weight percent (wt %) to about 80 wt % based on the total weight of the composite anode active material.

According to another exemplary embodiment, a method of preparing a composite anode active material includes milling a silicon-based material; milling at least one selected from a metal nitride and a metal carbide; and milling a metal silicide.

An overall milling process may be performed by simultaneously performing respective milling processes of milling a silicon-based material; milling at least one selected from a metal nitride and a metal carbide; and milling a metal silicide.

Alternatively, an overall milling process may include performing a first milling process including milling a silicon-based material with at least one selected from a metal nitride and a metal carbide; and then performing a second milling process including milling the resultant of the first milling process with a metal silicide. That is, from the first milling process, the second core member on the first core member defines a first combined member of the composite anode active material where the first combined member is defined by a milled combination of silicon and metal nitride or a milled combination of silicon and metal carbide, and from the second milling process, the coating layer on the at least one of the first core member and the second core member defines a second combined member of the composite anode active material, where the second milled member is defined by a milled combination of metal silicide and the first combined member.

In the method, the above-described milling processes may be respectively performed for 30 minutes or more, or, for example, about 4 hours to about 20 hours. When the milling processes are performed within this range of period of time, complexation among particles may be actively performed, and thus a lithium secondary battery including a composite anode active material thus obtained may have excellent capacity and lifespan characteristics.

A device used in the milling process is not particularly limited, and any milling device available in the art may be used. In an exemplary embodiment, for example, a SPEX® mill, a planetary mill or an attritor may be used.

In an exemplary embodiment, a solvent may be further added in the milling processes. Referring to the milling processes described above, when the milling is performed by adding a solvent, the materials being milled may be further pulverized into a smaller size. Examples of the solvent may include butanol, acetonitrile, acetone, methanol, ethanol, or N-methyl-2-pyrrolidone ("NMP"). In some exemplary embodiments, the solvent may be butanol. When butanol is used as a solvent, oxidation of the materials subjected to be milled may be reduced or effectively prevented, and removal of butanol after the milling may be performed relatively easily.

The silicon-based material may be Si particles, SiO particles, $SiO_{1.5}$ particles, or a composite of Si and $SiO_2$, but embodiments are not limited thereto, and any material available as a silicon-based material in the art may be used.

In an exemplary embodiment of the milling processes described above, a carbon-based material may be additionally included. The carbon-based material is not particularly limited, and examples of the carbon-based material may include carbon fibers, CNTs, graphites or amorphous carbon. An amount of the carbon-based material in the composite anode active material may be in a range of about 1 part to about 80 parts by weight based on 100 parts by weight of the total weight of the composite anode active material of the composite anode active material.

Also, in an exemplary embodiment, after the milling process, a sintering process after combining a precursor of a carbon-based material in an inert atmosphere may be additionally included in the method of preparing a composite anode active material. In the sintering process, the carbon-based precursor may be carbonized and thus additionally form a coating layer including a carbon-based material on at least surface of the composite anode active material.

According to another exemplary embodiment, an anode for a battery includes the composite anode active material. In an exemplary embodiment, for example, the anode may be manufactured by molding an anode active material composition including the composite anode active material in a predetermined shape or coating the anode active material composition on a current collector such as a copper foil.

An anode active material composition is prepared by combining the composite anode active material, a conducting agent, a binder and a solvent. The anode active material composition is directly coated on a metal current collector to prepare an anode plate. Alternatively, the anode active material composition is cast on a separate support to form a film of the anode active material composition, and the film detached from the separate support is laminated on a metal current collector to prepare an anode plate. The anode is not limited to the types described above, and any type of an anode including the anode active material composition may be used.

The anode active material composition may further include a carbon-based anode active material in addition to the composition anode active material. In an exemplary embodiment, for example, the carbon-based anode active material may be at least one selected from natural graphite, artificial graphite, expanded graphite, graphene, carbon black, CNTs and carbon fibers, but embodiments are not limited thereto, and any material available as a carbon-based material in the art may be used. An amount of the carbon-based anode active material may be in a range of about 1 wt % to about 85 wt % based on the total weight of the composite anode active material and the carbon-based anode active material.

The conducting agent may be, for example, acetylene black, ketjen black, natural black, artificial black, carbon black, carbon fibers, a metal powder or metal fiber of copper, nickel, aluminum, or silver; one type or a combination of conductive polymer such as a polyphenylene derivative, but embodiments are not limited thereto, and any material available as a conducting agent may be used. Also, a crystalline carbon-based material may be added as a conducting agent.

Examples of the binder may be vinylidene fluoride/hexafluoropropylene copolymer, polyvinylidene fluoride ("PVdF"), polyacrylonitrile, polymethylmethacrylate, polyacrylic acid, polyamideimide, polytetrafluoroethylene, a styrene butadiene rubber-based polymer or a combination thereof, but embodiments are not limited thereto, and any material available as a binder in the art may be used.

Examples of the solvent may be N-methylpyrrolidone ("NMP"), acetone, water or a combination thereof, but embodiments are not limited thereto, and any material available as a solvent in the art may be used.

In exemplary embodiments, amounts of the composite anode active material, the conducting agent, the binder and the solvent may be at the same levels used in a conventional lithium secondary battery but the invention is not limited thereto. At least one of the conducting agent, the binder and the solvent may be omitted depending on a use or a structure of the lithium battery including an anode including the composite anode active material.

According to another exemplary embodiment, a lithium secondary battery includes an anode including the composite anode active material. The lithium secondary battery is prepared as follows.

First, an anode is prepared according to an anode preparation method such as that described above.

Then, a cathode active material, a conducting agent, a binder and a solvent are combined to prepare a cathode active material composition. The cathode active material composition is directly coated and dried on a metal current collector to prepare a cathode plate. Alternatively, the cathode active material composition is cast on a separate support to form a cathode active material composition film, and the film detached from the separate support is laminated on a metal current collector to prepare a cathode plate.

The cathode active material may be at least one selected from a lithium cobalt oxide, a lithium nickel cobalt manganese oxide, a lithium nickel cobalt aluminum oxide, a lithium iron phosphate and a lithium manganese oxide, but embodiments are not limited thereto, and any material available as a cathode active material in the art may be used.

For example, the cathode active material may be represented by one of $Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}CO_bB_cO_{2-\alpha}F_2$ (where, $0.90 \leq a \leq 1.8$, $0 \leq b \leq 0.5$, $0 \leq c \leq 0.05$, and $0<\alpha<2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0<\alpha<2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0<\alpha<2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0<\alpha<2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $V_2O_5$; $LiV_2O_5$; $LiIO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A is Ni, Co, Mn or a combination thereof; B is Al, Ni, Co, Mn, Cr, Fe, Mg, Sr, V, a rare-earth element or a combination thereof; D is O, F, S, P or a combination thereof; E is Co, Mn or a combination thereof; F is F, S, P or a combination thereof; G is Al, Cr, Mn, Fe, Mg, La, Ce, Sr, V or a combination thereof; Q is Ti, Mo, Mn or a combination thereof; I is Cr, V, Fe, Sc, Y or a combination thereof; and J is V, Cr, Mn, Co, Ni, Cu or a combination thereof.

The cathode active material composition may have a coating layer on a surface thereof, or the cathode active material composition may be combined with a composition having a coating layer. The coating layer may include an oxide, a hydroxide an oxyhydroxide, an oxycarbonate or an hydroxycarbonate of a coating element composition. A composition that forms the coating layer may be amorphous or crystalline. The coating element included in the coating layer may be Mg, Al, Co, K, Na, Ca, Si, Ti, V, Sn, Ge, Ga, B, As, Zr or a combination thereof. A process of forming the coating layer may be any coating method that does not affect physical properties of a cathode active material (e.g., spray coating or dipping) using the element in the compounds, and this may be well understood by those skilled in the art, and thus description thereof will be omitted.

In an exemplary embodiment of the preparation of the cathode active material composition, a conducting agent, a binder and a solvent are the same as those used in the preparation of the anode active material composition. Also, a plasticizer may be further added to the cathode active material composition and/or the anode active material composition to form pores in an electrode plate.

In exemplary embodiments, amounts of the cathode active material, the conducting agent, the binder and the solvent may be at the same levels used in a conventional lithium secondary battery. At least one of the conducting agent, the binder and the solvent may be omitted depending on a use or a structure of the lithium battery including the cathode active material.

In a method of forming a battery, a separator that is to be interposed between the cathode and the anode is prepared. The separator may be any one of various separators conventionally used in a lithium battery. The separator may have a relatively low resistance to ion flow and a high electrolytic solution-retaining capability. Examples of the separator are glass fiber, polyester, Teflon, polyethylene ("PE"), polypropylene, polytetrafluoroethylene ("PTFE") and a combination thereof, and these separators may be in a non-woven or woven fabric form. In an exemplary embodiment, for example, a separator suitable for a lithium ion battery may be a rollable separator formed of, for example, polyethylene or polypropylene, and a separator suitable for a lithium ion polymer battery may be a separator that has an excellent organic electrolytic solution-retaining capability. An example of a method of forming the separator will now be described in detail.

A polymer resin, a filler and a solvent are combined to prepare a separator composition. The separator composition may be directly coated on an electrode and dried to form a separator. Alternatively, the separator composition may be cast on a support dried to form a film, the film is separated from the support as a separator film and then the separator film may be laminated on an electrode, thereby forming a separator.

The polymer resin used in forming the separator may not be particularly limited and may be any one of various materials that are used as a binder of an electrode plate. Examples of the polymer are a vinylidenefluoride/hexafluoropropylene copolymer, polyvinylidenefluoride ("PVDF"), polyacrylonitrile, polymethylmethacrylate and a combination thereof.

In a method of forming a battery, an electrolyte is prepared.

The electrolyte may be an organic electrolytic solution. In addition, the electrolyte may be solid instead of a solution. Examples of the solid electrolyte are boron oxide and lithium oxynitride, but are not limited thereto. The solid electrolyte may be any one of various solid electrolytes used in the art. The solid electrolyte may be formed on the anode by, for example, sputtering.

In an exemplary embodiment of an electrolyte, for example, an organic electrolytic solution may be prepared. The organic electrolytic solution may be prepared by dissolving a lithium salt in an organic solvent.

The organic solvent may be any one of various organic solvents used in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropylcarbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, 1,2-dimethoxyethane, sulfolane, dichloroethane, chlorobenzene, nitrobenzene, diethyleneglycol, dimethylether and a combination thereof.

The lithium salt may be any one of various lithium salts used in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where, each of x and y is a natural number), LiCl, LiI and a combination thereof.

Figure 2:
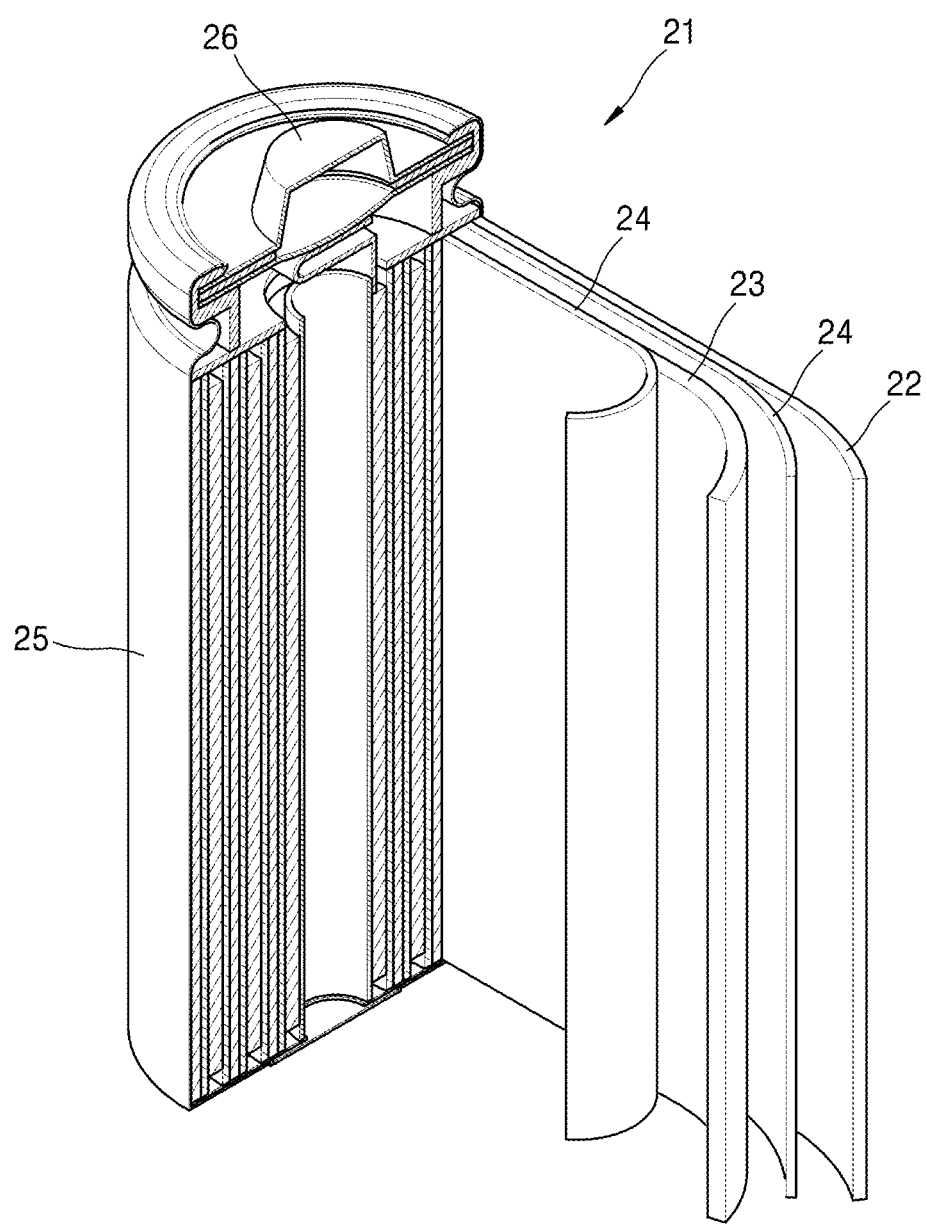
FIG. 2 is a schematic view of a lithium secondary battery according to another exemplary embodiment.

As shown in FIG. 2, a lithium secondary battery 21 includes a cathode 23, an anode 22 and a separator 24. Any of the aforementioned members may be provided in plural. The cathode 23, the anode 22 and the separator 24 are wound or folded such as about a center or reference, and then accommodated in a battery case 25. Subsequently, an electrolyte is injected into the battery case 25 having the wound or folded cathode 23, anode 22 and separator 24 therein, and the battery case 25 having the electrolyte, cathode 23, anode 22 and separator 24 therein is sealed by a cap assembly 26, thereby completing the manufacture of the lithium secondary battery 21. The battery case 25 may have an overall a cylindrical shape, a rectangular shape or a thin-film shape.

A battery assembly may be formed by interposing the separator between the cathode and the anode. A plurality of the battery assemblies may be stacked on each other to form a battery pack and/or a battery, and the battery pack and/or battery may be used in relatively high-capacity and high-performance devices, such as a notebook computer, a smart phone, an electric vehicle ("EV"), etc.

In particular, the lithium secondary battery has excellent capacity characteristics and lifespan characteristics and thus is appropriate for an electric vehicle ("EV"). In an exemplary embodiment, for example, the lithium secondary battery is appropriate for a hybrid vehicle such as a plug-in hybrid electric vehicle ("PHEV").

One or more embodiments will now be described in more detail with reference to the following examples. However, these examples are not intended to limit the scope of the one or more embodiments.

Example 1: Preparation of Composite Anode Active Material

Stainless balls (two of them having an average particle diameter of ¼ inch and four of them having an average particle diameter of ⅛ inch) were put into a combination of 1.36 grams (g) of silicon nanoparticles having an average particle diameter of about 50 nm (available from Aldrich), 0.74 g of $CaSi_2$ microparticles having an average particle diameter of about 40 micrometers (μm) (available from Aldrich), and 0.27 g of TiN particles having an average particle diameter of about 3 μm (available from Aldrich), and the combination of the above elements was milled by using a high-energy mechanical milling device (SPEX® CertiPrep) filled with argon (Ar) for 5 hours to prepare a composite anode active material.

Example 2: Preparation of Composite Anode Active Material

Stainless balls (two of them having an average particle diameter of ¼ inch and of them having an average particle diameter of ⅛ inch) were put into a combination of 4.5 g of silicon microparticles having an average particle diameter of about 5 μm (High-purity Chemical), 2.5 g of $CaSi_2$ microparticles having an average particle diameter of about 40 μm (available from Aldrich, technical grade), and 0.9 g of TiN particles having an average particle diameter of about 3 μm (available from Aldrich), and the combination was milled by using a high-energy mechanical milling device (SPEX® CertiPrep) filled with argon (Ar) for 5 hours to prepare a composite anode active material.

Example 3: Preparation of Composite Anode Active Material 0.55 g of the composite anode active material prepared in Example 2 was combined with 0.27 g of SFG6 (Timcal), which is a carbon-based material, graphite, and 0.95 g of pitch dissolved in 3 milliliters (ml) of tetrahydrofuran was added thereto, and the mixture was heat-treated at about 1100 degrees Celsius (° C.) for 4 hours under nitrogen atmosphere to obtain a composite anode active material.

Example 4: Preparation of Composite Anode Active Material 0.55 g of the composite anode active material prepared in Example 1 was mixed with 0.27 g of SFG6 (Timcal) (graphite), which is a carbon-based material, and 0.95 g of pitch dissolved in 3 ml of tetrahydrofuran was added thereto, and the mixture was heat-treated at about 1100° C. for 4 hours under nitrogen atmosphere to obtain a composite anode active material.

Example 5: Preparation of Composite Anode Active Material 4.5 g of silicon microparticles having an average particle diameter of about 5 μm (High-purity Chemical), 2.5 g of $CaSi_2$ microparticles having an average particle diameter of about 40 μm (Aldrich, technical grade), and 1.8 g of TiN particles having an average particle diameter of about 3 μm (Aldrich) were milled by using a high-energy mechanical milling device (SPEX® CertiPrep) filled with Ar for 5 hours to prepare a composite anode active material.

Example 6: Preparation of Composite Anode Active Material 1.125 g of silicon microparticles having an average particle diameter of about 5 μm (High-purity Chemical), 0.625 g of $CaSi_2$ microparticles having an average particle diameter of about 40 μm (Aldrich, technical grade), 0.25 g of TiN particles having an average particle diameter of about 3 μm (Aldrich), 25 g of butanol, and 20 g of zirconia beads having a diameter of 0.5 millimeter (mm) were used to perform a milling process by using a high-energy mechanical milling device (SPEX® CertiPrep) filled with Ar for 2 hours to prepare a composite anode active material.

Comparative Example 1: Preparation of Composite Anode Active Material

A composite anode active material was prepared in the same manner in Example 2, except that the TiN particles having an average particle diameter of about 3 μm (Aldrich) was not added.

Comparative Example 2: Preparation of Composite Anode Active Material

A composite anode active material was prepared in the same manner in Example 3, except that the TiN particles having an average particle diameter of about 3 μm (Aldrich) was not added.

Comparative Example 3: Anode Active Material 4.5 g of silicon microparticles having an average particle diameter of about 5 μm (High-purity Chemical) and 2.5 g of $CaSi_2$ microparticles having an average particle diameter of about 40 μm (Aldrich, technical grade) were simply combined to prepare an anode active material.

Manufacturing Example 1: Preparation of Anode and Coin Cell 0.045 g of a powder of the composite anode active material prepared in Example 2 and 0.18 g of graphite combination of artificial graphite and natural graphite having an average particle diameter of about 22.5 μm available from BTR were combined in a mortar, and 0.625 g of a 4 wt % lithium polyacrylate aqueous solution, as a binder, was added thereto and combined to prepare an anode active material slurry.

The lithium polyacrylate aqueous solution was prepared as follows.

462.2 g of distilled water and 12 g of lithium hydroxide were combined in a stirrer, and 36 g of polyacrylic acid (at a weight average molecular weight=450,000) was added there to. Distilled water was added thereto, and thus a lithium polyacrylate aqueous solution having an amount of lithium polyacrylate of 4 wt % was obtained.

The anode active material slurry was coated on a Cu foil having a thickness of 15 μm, dried in an oven at 80° C. for 1 hour, pressed, and dried in vacuum oven at 120° C. for 2 hours to prepare an anode plate, and thus a coin cell (CR2032 type) was prepared.

In the preparation of the coin cell, a metal lithium was used as a counter electrode, a polyethylene separator was used as a separator (available from Tonnen), and an electrolyte was prepared by dissolving 1.3 moles (M) of $LiPF_6$ in a solvent combination including ethylene carbonate ("EC"), diethylene carbonate ("DEC") and fluoroethylene carbonate ("FEC") at a volume ratio of 2:6:2.

Manufacturing Example 2: Preparation of Anode and Coin Cell

An anode and a coin cell were prepared in the same manner as in Manufacturing Example 1, except that 0.05 g of the composite anode active material powder prepared in Example 5 and 0.175 g of graphite combination including artificial graphite and natural graphite having an average particle diameter of about 20 μm to 25 μm available from BTR were combined in a mortar.

Manufacturing Example 3: Preparation of Anode and Coin Cell

An anode and a coin cell were prepared in the same manner as in Manufacturing Example 1, except that 0.146 g of the composite anode active material powder prepared in Example 4 and 0.079 g of graphite combination including artificial graphite and natural graphite having an average particle diameter of about 20 to 25 μm available from BTR were combined in a mortar.

Manufacturing Example 4: Preparation of Anode and Coin Cell

An anode and a coin cell were prepared in the same manner as in Manufacturing Example 1, except that 0.038 g of the composite anode active material powder prepared in Example 6, 0.075 g of SFG6 (Timcal), and 0.112 g of natural graphite having an average particle diameter of about 16 μm (Mitsubishi Chemical Corporation) were combined in a mortar.

Comparative Manufacturing Example 1: Preparation of Anode and Coin Cell 0.045 g of the composite anode active material powder prepared in Comparative Example 1 and 0.18 g of graphite combination including artificial graphite and natural graphite having an average particle diameter of about 22.5 μm available from BTR were combined in a mortar, and 0.625 g of 4 wt % lithium polyacrylate (Li-PAA) aqueous solution, as a binder, was added thereto, and combined to prepare an anode active material slurry.

The anode active material slurry was used to prepare an anode and a coin cell in the same manner as in Manufacturing Example 1.

Evaluation Example 1: Scanning Electron Microscope ("SEM")

Figure 3:
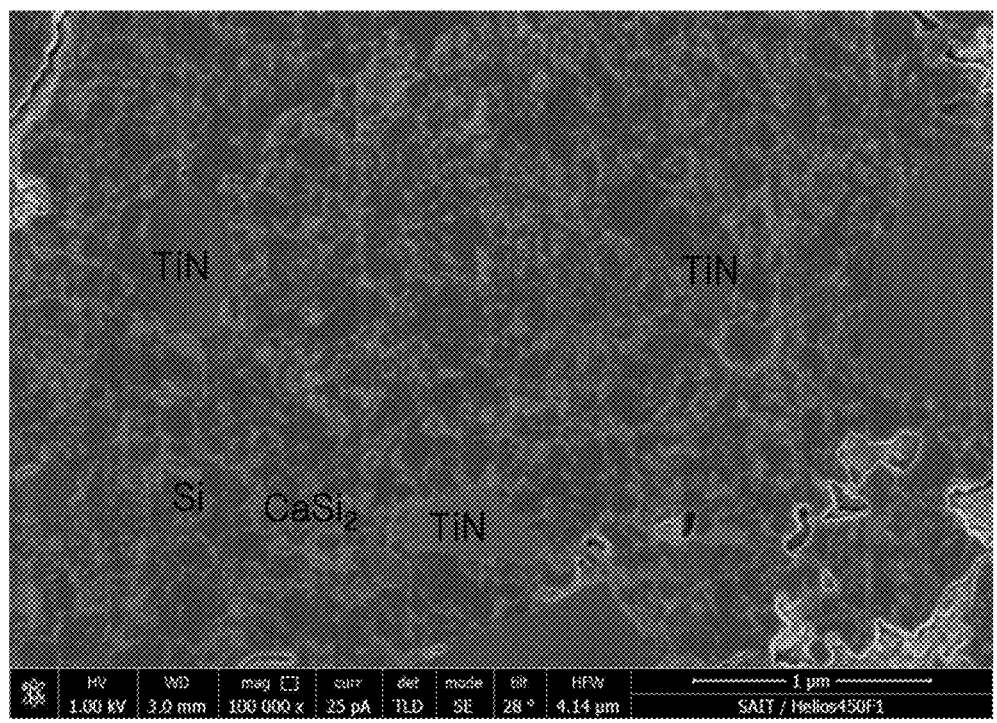
FIG. 3 is a scanning electron microscope image of a cross-section of a composite anode active material prepared in Example 1.

A cross-sectional SEM image of the composite anode active material prepared in Example 1 is shown in FIG. 3. The SEM analysis was performed by using Helios450F1 (FEI Company).

Referring to FIG. 3, it can be observed that the composite anode active material prepared in Example 1 was well combined as $CaSi_2$ is included a interfacial layers between Si and TiN particles.

Evaluation Example 2: X-Ray Diffraction Analysis

X-ray diffraction analysis was performed on the composite anode active material prepared in Example 2 and the composite anode active material prepared in Comparative Example 3 by using X'pert pro (PANalytical) using Cu-Kα radiation (1.54056 angstroms (Å).

Figure 4:
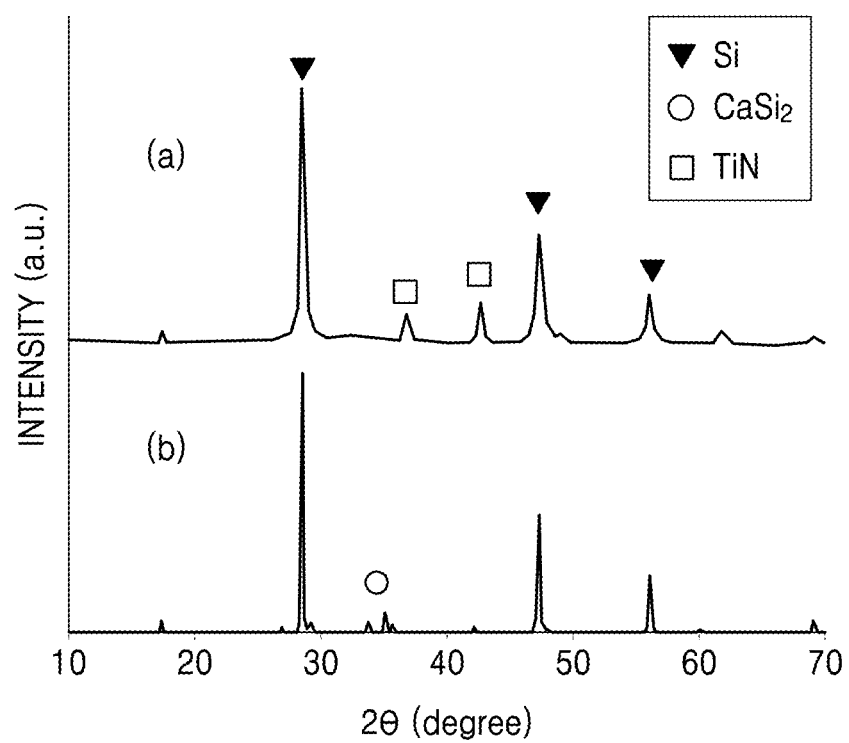
FIG. 4 shows the results of X-ray diffraction analysis performed on a composite anode active material prepared in Example 2 and a composite anode active material prepared in Comparative Example 3.

The results of the X-ray diffraction analysis are shown in FIG. 4, and (a) and (b) in FIG. 4 illustrate the results of the X-ray diffraction analysis performed on the composite anode active material prepared in Example 2 and the composite anode active material prepared in Comparative Example 3, respectively.

As shown in FIG. 4, the anode active material of Comparative Example 3 had a $CaSi_2$ peak, whereas, the composite anode active material of Example 2 almost did not have a $CaSi_2$ peak since $CaSi_2$, which has a relatively low hardness, was amorphized.

Crystalline sizes of the silicon were calculated according to Equation 1 as suggested by Scherrer from full width at half maximum ("FWHM") values with respect to silicon by using the results of X-ray diffraction analysis of FIG. 4, and the calculated results are shown in Table 1.

$$d = 0.9 \times \lambda / (B \times \cos \theta) \quad \text{[Equation 1]}$$

In Equation 1, d is a size of crystal, λ is a wavelength of X-ray, θ is a Bragg's angle, and B is a full width at half maximum of a peak intensity.

TABLE 1

|  | Crystal size of silicon (nm) |
| --- | --- |
| Example 2 | 28 |
| Comparative Example 3 | 44 |

Referring to Table 1, it may be observed that a silicon crystal size of the composite anode active material of Example 2 decreases compared to that of the anode active material of Comparative Example 3. In this regard, it may be known that the silicon crystal size may be decreased by accelerating pulverization of silicon microparticles when TiN is added. When silicon with a decreased crystal size is used, an anode and a lithium secondary battery including the anode active material of Example 2 may have improved capacity retention ratio.

Evaluation Example 3: Conductivity

Conductivities of the composite anode active materials prepared in Examples 2 and 3 and the composite anode active materials prepared in Comparative Examples 1 and 2 were measured.

The conductivities (siemens per centimeter, S/cm) were measured by using a power resistivity measurement system of Mitsubishi chemical at pressures of 12 kilonewtons (kN) and 20 kN, and the results are shown in Table 2.

TABLE 2

|  | Conductivity (S/cm) @ 12 kN | Conductivity (S/cm) @ 20 kN |
| --- | --- | --- |
| Example 2 | $1.29 \times 10^{-3}$ | $3.60 \times 10^{-3}$ |
| Comparative Example 1 | $9.60 \times 10^{-4}$ | $2.74 \times 10^{-3}$ |
| Example 3 | $7.73 \times 10^{+1}$ | $1.46 \times 10^{+2}$ |
| Comparative Example 2 | $2.57 \times 10^{+1}$ | $4.25 \times 10^{+1}$ |

As shown in Table 2, the composite anode active material of Example 2 includes $CaSi_2$ and TiN having higher conductivity at the same time compared to those of silicon, and thus conductivity thereof was improved compared to that of the composite anode active material prepared in Comparative Example 1. Also, the composite anode active material of Example 3 includes $CaSi_2$ and TiN having higher conductivity at the same time compared to those of silicon, and further includes a carbon-based material, and thus conductivity thereof was improved compared to that of the composite anode active material prepared in Comparative Example 2.

As a result, it may be known that, in the preparation of a composite anode active material, when TiN is combined, conductivity of the composite anode active material increases significantly.

Evaluation Example 4: Charging/Discharging Characteristic Evaluation

Charging/discharging was performed between a voltage range of about 1.5 volts (V) and about 0.01 volt (V) on each of the coin cells prepared in Manufacturing Examples 1 to 4 and Comparative Manufacturing Example 1.

In the first cycle, the coin cell was charged at a constant current of 0.1 C until a voltage was 0.01 V vs a Li electrode, and was then charged at a constant voltage until a current was 0.01 C. Then, the charged cell rested for 10 minutes, and the cell was discharged at a constant current of 0.1 C until a voltage was 1.5 V. In the second cycle, the coin cell was charged at a constant current of 0.2 C until a voltage was 0.01 V vs a Li electrode, and was then charged at a constant voltage until a current was 0.01 C. Then, the charged cell rested for 10 minutes, and the cell was discharged at a constant current of 0.2 C until a voltage was 1.5 V. As used herein, C rate means a current which will discharge a battery in one hour, e.g., a C rate for a battery having a discharge capacity of 1.6 ampere-hours would be 1.6 amperes.

Lifespan evaluation was performed as follows. The coin cell was charged at a constant current of 0.01 C until a voltage was 0.01 V vs a Li electrode, and was then charged at a constant voltage until a current was 0.01 C. Then, the charged cell rested for 10 minutes, and the cell was discharged at a constant current of 1 C until a voltage was 1.5 V to complete one charging/discharging cycle. 50 charging/discharging cycles were performed on each of the coin cells, and the results are shown in Table 3.

Initial efficiency and capacity retention ratios are calculated as defined in Equations 2 and 3.

Initial efficiency (percent, %)=[Discharge capacity of $1^{st}$ cycle/charge capacity of $1^{st}$ cycle]×100  [Equation 2]

Capacity retention ratio (@1 C)(percent, %)=[Discharge capacity of $50^{th}$ cycle/discharge capacity of $1^{st}$ cycle]×100  [Equation 3]

TABLE 3

|  | Discharge capacity of 1st cycle (mAh/g) | Initial efficiency (%) | Capacity retention ratio (%) |
| --- | --- | --- | --- |
| Comparative Manufacturing Example 1 | 766 | 90 | 30 |
| Manufacturing Example 1 | 714 | 91 | 42 |
| Manufacturing Example 2 | 684 | 91 | 46 |
| Manufacturing Example 3 | 636 | 91 | 71 |
| Manufacturing Example 4 | 637 | 91 | 90 |

As shown in Table 3, initial efficiency of each of the coin cells prepared in Manufacturing Examples 1 to 4 is improved compared than that of the coin cell of Comparative Manufacturing Example 1, and, lifespan characteristics of the coin cells prepared in Manufacturing Examples 1 to 4 improved significantly than those of the coin cell of Comparative Manufacturing Example 1.

Also, the coin cell prepared in Manufacturing Example 2 included twice an amount of TiN compared to that of the coin cell prepared in Manufacturing Example 1, where a capacity retention ratio of the coin cell prepared in Manufacturing Example 2 further improved. In this regard, it may be known that despite a capacity of an active material itself decreases by addition of TiN, but TiN is effective in improving capacity retention ratio.

As described above, when a composite anode active material according to one or more embodiment is used, a lithium secondary battery with improved capacity retention ratio may be manufactured.

It should be understood that exemplary embodiments described herein should be considered in a descriptive sense only and not for purposes of limitation. Descriptions of features within each exemplary embodiment should typically be considered as available for other similar features in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite anode active material comprising:
a first core member comprising a silicon-containing material;
a second core member comprising at least one selected from metal nitride and metal carbide; and
a coating layer containing metal silicide, on at least one of the first core member and the second core member,
wherein the coating layer containing the metal silicide defines an outermost surface of the composite anode active material.

2. The composite anode active material of claim 1, wherein the at least one selected from the metal nitride and the metal carbide comprises at least one metal selected from titanium (Ti), vanadium (V), copper (Cu), zinc (Zn), molybdenum (Mo), nickel (Ni), aluminum (Al), magnesium (Mg), iron (Fe), tantalum (Ta), tungsten (W), zirconium (Zr) and chromium (Cr).

3. The composite anode active material of claim 1, wherein the at least one selected from the metal nitride and the metal carbide is titanium nitride (TiN), titanium carbide (TiC) or a combination thereof.

4. The composite anode active material of claim 1, wherein an amount of the at least one selected from the metal nitride and the metal carbide is in a range of about 1 part to about 70 parts by weight of 100 parts by weight of the silicon-containing material.

5. The composite anode active material of claim 1, wherein an amount of the metal silicide is in a range of about 0.1 part to about 70 parts by weight based on 100 parts by weight of the silicon-containing material.

6. The composite anode active material of claim 1, wherein the coating layer completely covers the first core member and the second core member.

7. The composite anode active material of claim 1, wherein the metal silicide is at least one selected from $TiSi_2$, $CaSi_2$, $Mg_2Si$, $Cu_3Si$, NiSi and FeSi.

8. The composite anode active material of claim 1, wherein the metal silicide is amorphous or low-crystalline.

9. The composite anode active material of claim 1, wherein the silicon-containing material is selected from silicon (Si), $SiO_x$ (where, 0<x<2), a silicon-containing alloy, and a combination thereof.

10. The composite anode active material of claim 1 further comprising a carbon-containing material.

11. An anode comprising:
an anode active material member defined by a shaped composite anode active material,
the shaped composite anode active material comprising:
a first core member comprising a silicon-containing material;
a second core member comprising at least one selected from metal nitride and metal carbide; and
a coating layer containing metal silicide, on at least one of the first core member and the second core member,
wherein the coating layer containing the metal silicide defines an outermost surface of the composite anode active material.

12. The anode of claim 11, wherein the at least one selected from the metal nitride and the metal carbide comprises at least one metal selected from titanium (Ti), vanadium (V), copper (Cu), zinc (Zn), molybdenum (Mo), nickel (Ni), aluminum (Al), magnesium (Mg), iron (Fe), tantalum (Ta), tungsten (W), zirconium (Zr) and chromium (Cr).

13. The anode of claim 11, wherein the at least one selected from the metal nitride and the metal carbide is a titanium nitride (TiN), a titanium carbide (TiC) or a combination thereof.

14. The anode of claim 11, wherein an amount of the at least one selected from the metal nitride and the metal carbide is in a range of about 1 part to about 70 parts by weight of 100 parts by weight of the silicon-containing material.

15. The anode of claim 11, wherein an amount of the metal silicide is in a range of about 0.1 part to about 70 parts by weight based on 100 parts by weight of the silicon-containing material.

16. The anode of claim 11, wherein the coating layer completely covers the first core member and the second core member.

17. The anode of claim 11, wherein the metal silicide is at least one selected from $TiSi_2$, $CaSi_2$, $Mg_2Si$, $Cu_3Si$, NiSi and FeSi.

18. The anode of claim 11, wherein the metal silicide is amorphous or low-crystalline.

19. A lithium secondary battery comprising the anode of claim 11.

* * * * *